United States Patent
Kasuya et al.

(10) Patent No.: US 10,144,189 B2
(45) Date of Patent: Dec. 4, 2018

(54) MOLD FOR BRAKE PAD FRICTION MATERIAL, MANUFACTURING APPARATUS, MANUFACTURING METHOD, PREFORM, AND BRAKE PAD

(71) Applicant: AKEBONO BRAKE INDUSTRY CO., LTD., Tokyo (JP)

(72) Inventors: Hiroshi Kasuya, Tokyo (JP); Takuya Kitami, Tokyo (JP); Motoyuki Miyaji, Tokyo (JP); Michinori Yanagi, Tokyo (JP)

(73) Assignee: AKEBONO BRAKE INDUSTRY CO., LTD., Tokyo (JP)

(*) Notice: Subject to any disclaimer, the term of this patent is extended or adjusted under 35 U.S.C. 154(b) by 0 days.

(21) Appl. No.: 14/899,264

(22) PCT Filed: Jun. 17, 2014

(86) PCT No.: PCT/JP2014/066021
§ 371 (c)(1),
(2) Date: Dec. 17, 2015

(87) PCT Pub. No.: WO2014/203889
PCT Pub. Date: Dec. 24, 2014

(65) Prior Publication Data
US 2016/0129656 A1 May 12, 2016

(30) Foreign Application Priority Data
Jun. 18, 2013 (JP) .................................. 2013-127494

(51) Int. Cl.
*B30B 15/02* (2006.01)
*F16D 65/04* (2006.01)
(Continued)

(52) U.S. Cl.
CPC .......... *B30B 15/022* (2013.01); *B30B 15/065* (2013.01); *F16D 65/04* (2013.01);
(Continued)

(58) Field of Classification Search
CPC ...... F16D 69/0416; F16D 65/04; F16D 69/00; F16D 69/02; B30B 15/022; B30B 15/065
See application file for complete search history.

(56) References Cited

U.S. PATENT DOCUMENTS 2,690,820 A * 10/1954 Raes ....................... F16D 69/00
                                                          188/250 G
2,727,845 A * 12/1955 Bishop .................. F16D 69/025
                                                          156/212
(Continued)

FOREIGN PATENT DOCUMENTS

CN        102102719 A      6/2011
EP        0093655 A1 * 11/1983  ............. B29C 35/08
(Continued)

OTHER PUBLICATIONS

CN Office Action dated Jun. 30, 2016 from corresponding Chinese patent application No. 201480035069.6 (with attached English-language translation).
(Continued)

*Primary Examiner* — Melanie Torres Williams
(74) *Attorney, Agent, or Firm* — Drinker Biddle & Reath LLP

(57) ABSTRACT

A mold of a brake pad friction material, including a mold member fitted into a mold frame into which a powder material of the brake pad friction material is put, in which the mold member is configured such that a pressing surface in a surface of the mold member, which forms a region abutting the powder material put into a mold frame, has a concave shape that is formed by being gradually recessed (Continued)

from both end portion sides to a center portion side of the pressing surface.

5 Claims, 8 Drawing Sheets

(51) Int. Cl.
*B30B 15/06* (2006.01)
*F16D 69/00* (2006.01)
*F16D 69/02* (2006.01)
*B29K 105/00* (2006.01)
*B29L 31/30* (2006.01)

(52) U.S. Cl.
CPC .............. *F16D 69/00* (2013.01); *F16D 69/02* (2013.01); *B22F 2999/00* (2013.01); *B29K 2105/251* (2013.01); *B29L 2031/30* (2013.01); *F16D 2069/004* (2013.01); *F16D 2200/0004* (2013.01); *F16D 2200/0086* (2013.01)

(56) References Cited

U.S. PATENT DOCUMENTS

| | | | | |
|---|---|---|---|---|
| 2,873,517 | A * | 2/1959 | Wellman | B22F 7/04 188/251 M |
| 2,973,842 | A * | 3/1961 | Smiley | F16D 69/02 188/251 M |
| 5,190,991 | A | 3/1993 | Parker | |
| 5,413,194 | A * | 5/1995 | Kulis, Jr. | B29C 43/006 188/251 A |
| 5,641,444 | A * | 6/1997 | Fujikawa | F16D 69/02 264/141 |
| 5,799,754 | A * | 9/1998 | Kazuro | F16D 65/02 188/1.11 W |
| 6,245,180 | B1 * | 6/2001 | Barnhardt | B29C 35/0222 156/212 |
| 6,284,074 | B1 * | 9/2001 | Braund | B29C 35/0222 156/228 |
| 2011/0147991 | A1 | 6/2011 | Toshima et al. | |
| 2012/0058340 | A1 | 3/2012 | Shima et al. | |
| 2012/0085604 | A1 | 4/2012 | Dallegrave | |
| 2014/0190777 | A1 * | 7/2014 | Dallegrave | B02C 23/08 188/250 G |

FOREIGN PATENT DOCUMENTS

| | | | |
|---|---|---|---|
| EP | 2 592 299 A1 | 5/2013 | |
| GB | 2148424 A * | 5/1985 | ............ B29C 43/36 |
| JP | UM-A-S59-108835 | 7/1984 | |
| JP | A-H02-134426 | 5/1990 | |
| JP | UM-Y-H02-37295 | 10/1990 | |
| JP | A-H05-346128 | 12/1993 | |
| JP | H06-159407 A | 6/1994 | |
| JP | UM-H06-042944 | 6/1994 | |
| JP | A-H09-089023 | 3/1997 | |
| JP | A-H11-241743 | 9/1999 | |
| JP | H11-303913 A | 11/1999 | |
| JP | 2002295555 A * | 10/2002 | |
| JP | 2002295556 A * | 10/2002 | |
| JP | A-2004-347095 | 12/2004 | |
| JP | 2006-083978 A | 3/2006 | |
| JP | 4017570 B2 | 9/2007 | |
| JP | 2011-127710 A | 6/2011 | |
| JP | 2011-132991 A | 7/2011 | |
| JP | 2011-158006 A | 8/2011 | |
| WO | WO 2010-144977 | 12/2010 | |
| WO | WO 2010144977 A1 * | 12/2010 | ............ F16D 69/00 |
| WO | WO-2012/004844 A1 | 1/2012 | |

OTHER PUBLICATIONS

Extended European Search Report dated Feb. 1, 2017 in corresponding European patent application 14813915.7 (8 pages).
Japanese Office Action dated Jan. 24, 2017 from corresponding Japanese patent application No. 2013-127494 (with attached English-language translation).
Chinese Office Action dated Mar. 1, 2017 from corresponding Chinese patent application No. 201480035069.6 (with attached English-language translation).

* cited by examiner

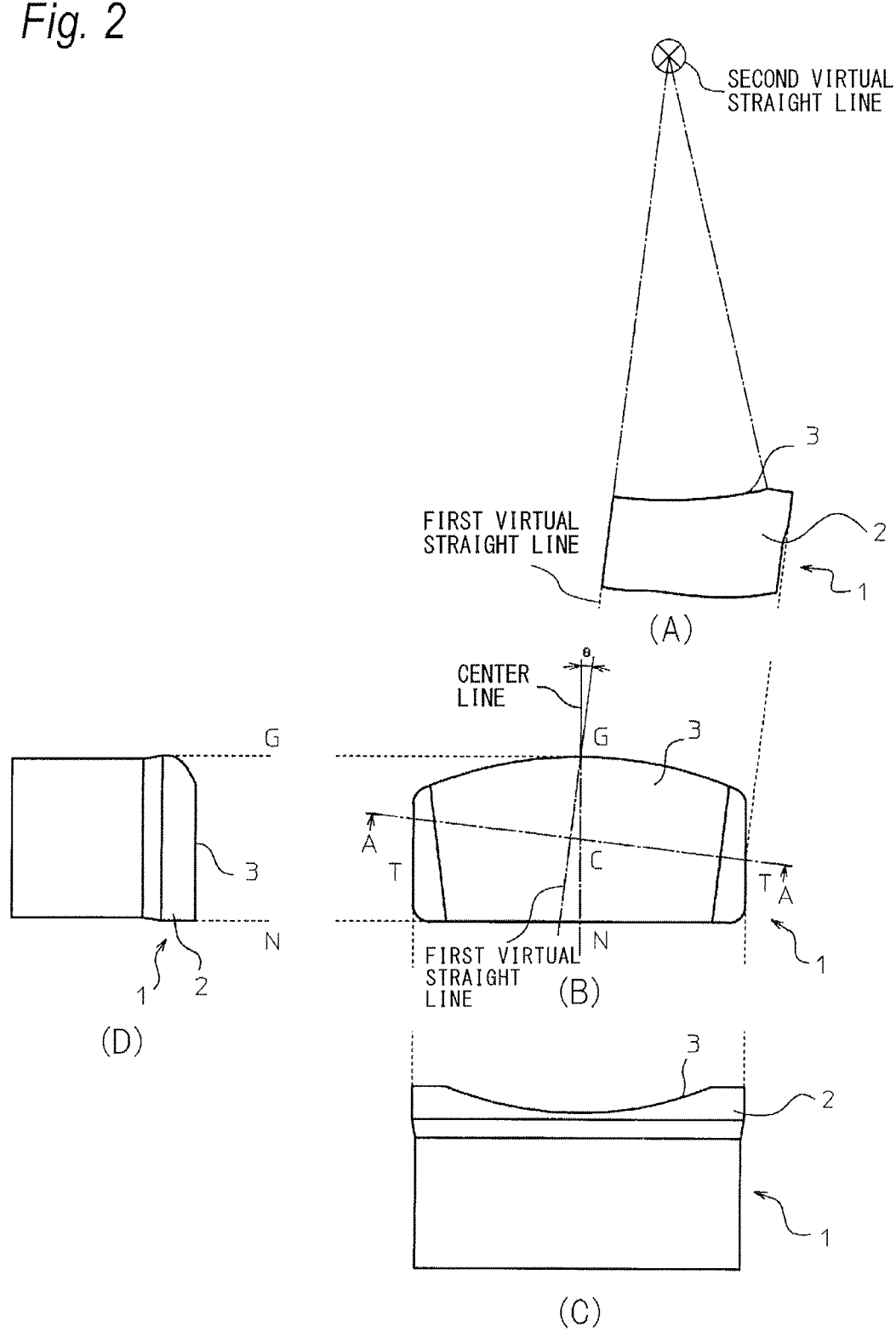

Fig. 4
(A)
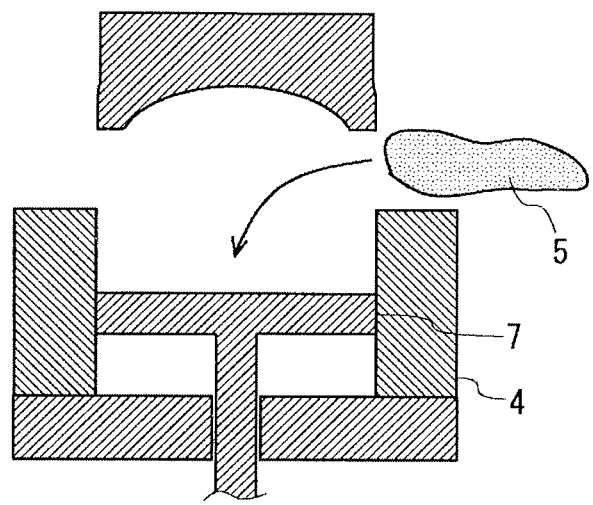
(B)
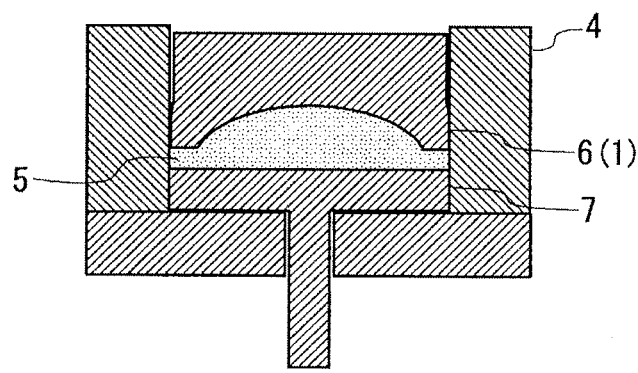
(C)
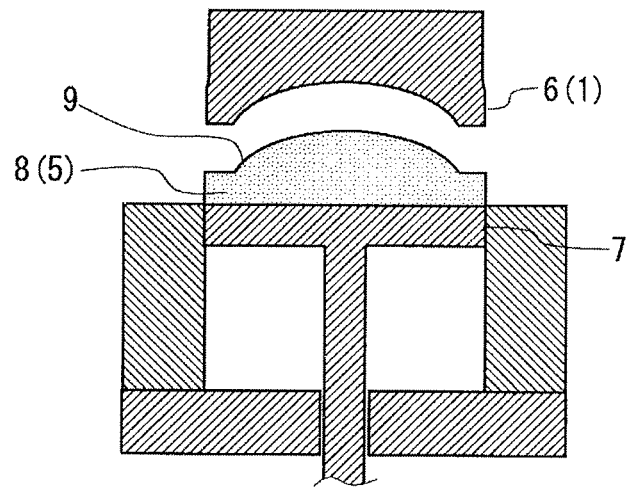

Fig. 5
(A)
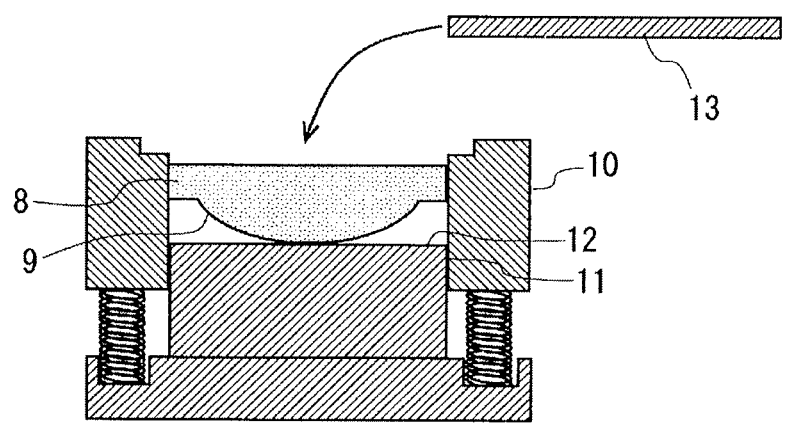
(B)
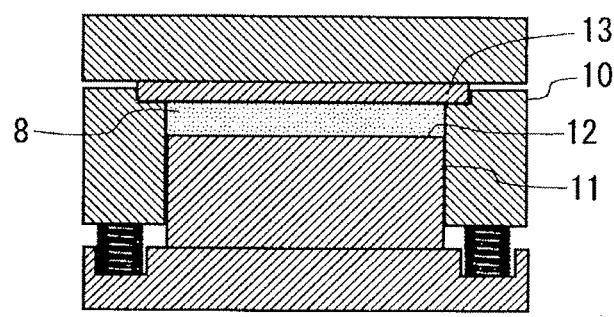
(C)
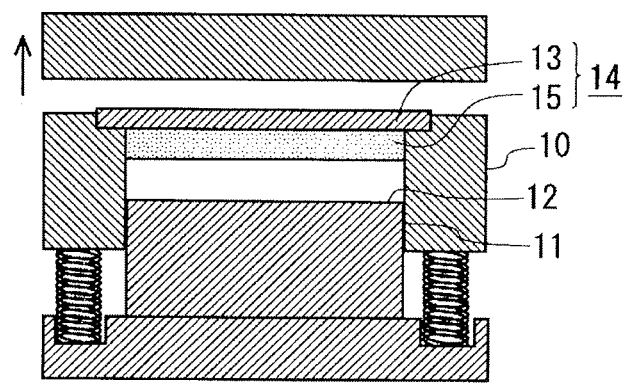

Fig. 6
(A)
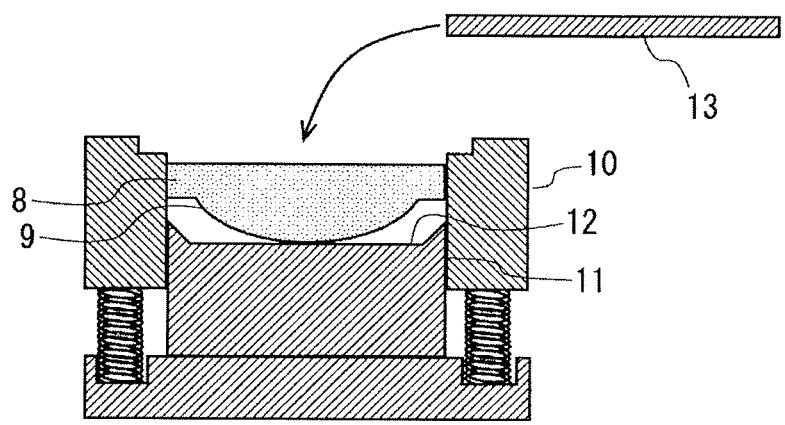
(B)
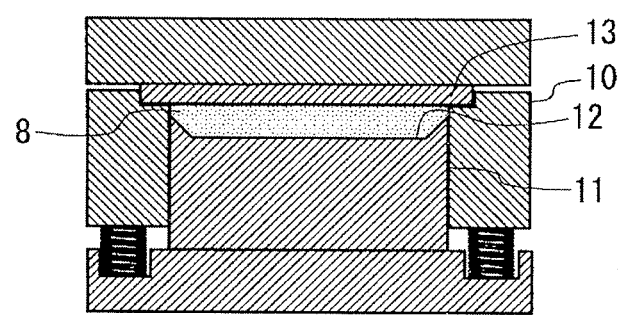
(C)
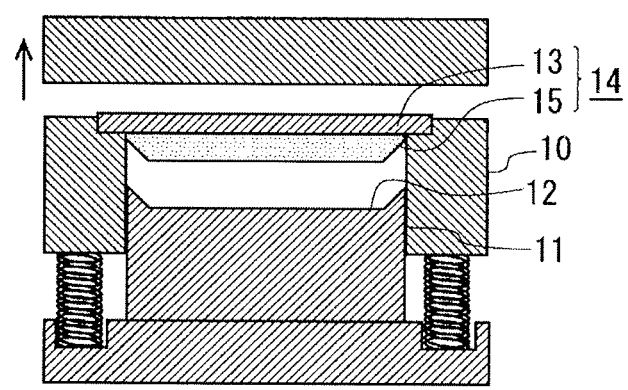

MOLD FOR BRAKE PAD FRICTION MATERIAL, MANUFACTURING APPARATUS, MANUFACTURING METHOD, PREFORM, AND BRAKE PAD

TECHNICAL FIELD

The present invention relates to a mold for a brake pad friction material, a manufacturing apparatus, a manufacturing method, a preform, and a brake pad.

BACKGROUND ART

A brake pad is provided with chamfered portions (sometimes referred to as chamfered sections) at both end portions for a purpose of preventing squeal during braking (see PTL 1). Typically, Care has been taken that a brake pad friction material has generally uniform physical properties in hardness and density, or the like from a stage of design (see PTLs 2 to 4).

CITATION LIST

Patent Literature

[PTL 1] JP-A-2011-132991
[PTL 2] JP-A-2006-83978
[PTL 3] JP-A-2011-127710
[PTL 4] JP-A-2011-158006

SUMMARY OF INVENTION

Technical Problem

Squeal of the brake pad during braking tends to easily occur if the hardness and the density of a friction material in both end portions are higher than those in a center portion. However, if a powder material is put into the mold, is compressed, and molded, since a portion of the powder material in the powder material put into the mold, which comes into contact with the mold, relatively is easily subjected to a compressive force and heat, the hardness and the density of the friction material in both end portions is likely to be relatively higher than those of the center portion.

The invention is made in view of the problems described above and an object of the invention is to provide a mold for a brake pad friction material allowing physical properties of a friction material in both end portions of a brake pad to be appropriate, a manufacturing apparatus, a manufacturing method, a preform, and a brake pad.

Solution to Problem

In order to solve the problems described above, the invention makes a pressing surface of the mold which presses and molds a powder material of the brake pad friction material be a concave surface that is formed by being gradually recessed from both end portion sides to a center portion side of the pressing surface.

Specifically, the mold for a brake pad friction material includes a mold member fitted into a mold frame into which a powder material of the brake pad friction material is put, the mold member has a concave shape that a pressing surface in the surface of the mold member, which forms a region abutting the powder material put into the mold frame, is gradually recessed from the both end portion sides to a center portion side of the pressing surface.

Typically, the brake pad friction material is molded by being heated and pressurized while being pressed on a pressing surface after a powder material of the friction material is preformed. The powder material after being preformed is substantially compacted, fluidity is lost. Meanwhile, the powder material before pressed molding can flow in accordance with a shape of the pressing surface of the mold.

Then, the mold described above is a mold for molding the powder material by pressing the powder material and includes the mold member fitted into the mold frame into which the powder material is put. The pressing surface pressing the powder material is formed in a region in the surface of the mold member which abuts the powder material put into the mold frame. The pressing surface forms the concave surface that is formed by being gradually recessed from the both end portion sides to the center portion side. Thus, the mold member is fitted into the mold frame into which the powder material is put before fluidity is lost and if the pressing surface presses the powder material, the powder material within the mold frame flows in accordance with the shape of the pressing surface. As a result, the mold frame described above gathers the powder material from the both end portion sides to the center portion side of the pressing surface and a surface forming the friction surface in the preform is formed in a convex shape gradually swelling from the both end portion sides to the center portion side.

In the preform that is formed by the mold described above, the surface forming the friction surface is formed in the convex shape gradually swelling from the both end portion sides to the center portion side, the powder material after being preformed is in a substantially compacted state, and then fluidity is already lost. Thus, if pressed molding is performed by a mold in which a flat friction surface is formed, at least the hardness and the density of both end portions are unlikely to be higher than those of the center portion. Thus, if it is a brake pad that is manufactured from the preform that is formed by the mold described above, it is possible to allow the physical properties of the friction material of both end portions of the brake pad to be appropriate.

Moreover, the pressing surface may be inclined from a portion corresponding to an inner peripheral side of a brake rotor to a portion corresponding to an outer peripheral side of the brake rotor. Since a distance of the portion on the outer peripheral side of the brake rotor from an axle is farther than that of the portion on the inner peripheral side, a peripheral speed of the portion on the outer peripheral side of the brake rotor is faster than a peripheral speed of the portion on the inner peripheral side of the brake rotor. However, if the pressing surface is inclined to incline from the portion corresponding to the inner peripheral side of the brake rotor to the portion corresponding to the outer peripheral side of the brake rotor, the mold is configured such that the surface in the preform, which forms the friction surface, is formed to gradually swell from the portion corresponding to the inner peripheral side to the portion corresponding to the outer peripheral side of the brake rotor. If the preform that is formed as described above is pressed and molded by the mold forming the flat friction surface, at least the density and the hardness on the outer peripheral side is unlikely to be lower more than those on the inner peripheral side. Thus, it is possible to allow the physical properties to be appropriate in accordance with the peripheral speed of a rotating brake rotor.

Furthermore, the pressing surface may have flat portions in both end portions. If there are the flat portions in both end portions of the pressing surface, since the physical properties of a chamfered portion of the friction material for the purpose of preventing squeal are generally uniform, strength of the chamfered portion is stable.

Furthermore, the invention can be grasped as an aspect of a manufacturing apparatus. For example, the invention may be a manufacturing apparatus of a brake pad friction material including a mold frame into which a powder material of the brake pad friction material is put, a mold member fitted into a mold frame, and pressing means for pressing the mold member, and pressurizing and molding the powder material put into the mold frame by the mold member, in which the mold member has a concave shape that the pressing surface in the surface of the mold member, which forms the region abutting the powder material put into the mold frame, is gradually recessed from the both end portion sides to the center portion side of the pressing surface, and the pressing means pressurizes and molds the powder material put into the mold frame by the pressing surface.

Furthermore, the invention can be grasped as an aspect of a manufacturing method. For example, the invention may be a manufacturing method of a brake pad friction material including putting a powder material of a brake pad friction material into a mold frame into which a mold member is fitted, and pressing the mold member, pressurizing and molding the powder material put into the mold frame by a pressing surface in a surface of the mold member, which forms a region abutting the powder material put into the mold frame and has a concave shape formed by being gradually recessed from the both end portion sides to the center portion side of the pressing surface.

Furthermore, the invention can be grasped as an aspect of an intermediate product. For example, the invention may be a preform that is obtained by pressurizing and forming a powder material of a brake pad friction material, in which a friction surface forming region in a surface of the preform, which forms a friction surface coming into contact with a brake rotor, has a convex shape gradually swelling from the both end portion sides to the center portion side of the friction surface forming region.

Furthermore, the invention can be grasped as an aspect of a final product. For example, the invention is a brake pad including a thermoformed product that is obtained by thermally forming a powder material of a brake pad friction material. The thermoformed product has a friction surface coming into contact with a brake rotor, the friction surface forms a part of a surface of the thermoformed product, and at least hardness and density of both end portions of the thermoformed product are not higher than those of a center portion of the thermoformed product.

Advantageous Effects of Invention

If the mold of the brake pad friction material, the manufacturing apparatus, the manufacturing method, the preform, and the brake pad are provided, it is possible to allow the physical properties of the friction material of both end portions of the brake pad to be appropriate.

BRIEF DESCRIPTION OF DRAWINGS

FIGS. 2(A) to 2(D) are a second example of views illustrating the mold of the brake pad friction material according to an embodiment.

FIGS. 4(A) to 4(C) are an example of views illustrating a manufacturing method of the brake pad friction material using the mold.

FIGS. 5(A) to 5(C) are a first example of views illustrating a manufacturing method of a brake pad.

FIGS. 6(A) to 6(C) are a second example of views illustrating a manufacturing method of a brake pad.

DESCRIPTION OF EMBODIMENTS

Figure 1:
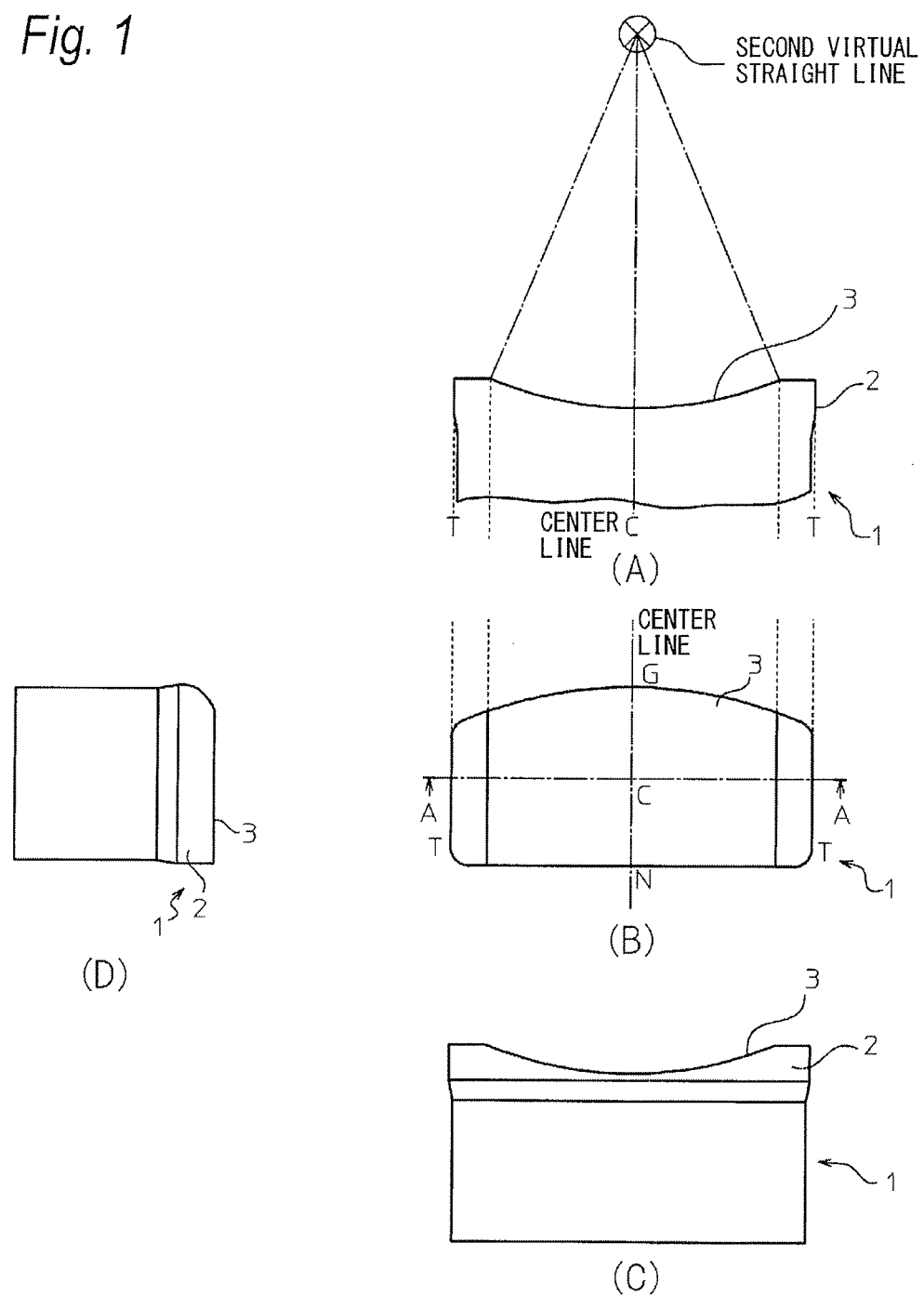
FIGS. 1(A) to 1(D) are a first example of views illustrating a mold of a brake pad friction material according to an embodiment.

Hereinafter, embodiments of the invention will be described. The following embodiments exemplify an aspect of the invention of this application and a technical scope of the invention of this application is not limited to the following aspect.

FIGS. 1(A) to 1(D) are a first example of views illustrating a mold of a brake pad friction material according to an embodiment. A mold 1 is a mold for preforming a brake pad friction material to be applied to a disc brake and includes a mold member 2. A pressing surface 3 is formed in the mold member 2. The mold member 2 is fitted into a mold frame into which a powder material of the brake pad friction material is put. The pressing surface 3 is a surface in the surface of the mold member 2, which forms a region abutting the powder material put into the mold frame. As illustrated in a sectional view of FIG. 1(A) that is taken along line A-A, the pressing surface 3 is recessed in a concave shape. A half of the pressing surface 3 on one side is recessed along an arc of which an axis is a virtual straight line orthogonal to the cross section of line A-A. Then, the pressing surface 3 is formed symmetrically on right and left sides. Thus, as illustrated in a top view of FIG. 1(B), the pressing surface 3 forms a curved surface of a concave shape that is formed by being gradually recessed from an end portion T side to a center portion C side of the pressing surface 3. On the other hand, as illustrated in a top view of FIG. 1(B) and a front view of FIG. 1(C), it is not inclined from a portion N corresponding to an inner periphery side of a brake rotor to a portion G corresponding to an outer periphery side of the brake rotor. Moreover, as illustrated in the top view of FIG. 1(B) and a left side view of FIG. 1(D), the pressing surface 3 has flat portions in both end portions.

Meanwhile, in FIGS. 1(A) to 1(D), an aspect, which is recessed along an arc of which an axis is a second virtual straight line orthogonal to an extension line of a center line of the pressing surface 3, is adopted. The mold 1 according to the embodiment is not limited to such an aspect. FIGS. 2(A) to 2(D) are a second example of views illustrating the mold of the brake pad friction material according to the embodiment. For example, as illustrated in a sectional view of FIG. 2(A) that is taken along line A-A and a top view of FIG. 2(B), a mold 1 according to the embodiment may adopt an aspect in which a cross section of line A-A is inclined with respect to a center line of a pressing surface 3 by θ degrees and which is recessed along an arc of which an axis is a second virtual straight line orthogonal to an extension line of a first virtual straight line orthogonal to the cross section of line A-A which is inclined by the degrees described above. Furthermore, the mold 1 according to the embodiment may adopt an aspect which is recessed along the arc of which the axis is the second virtual straight line orthogonal to the extension line of the first virtual straight line which is inclined by less than θ degrees with respect to the center line of the pressing surface 3, or may adopt an aspect which is recessed along the arc of which the axis is the second virtual straight line orthogonal to the extension line of the first virtual straight line which is inclined by more than θ degrees with respect to the center line of the pressing surface 3. If the inclination of the first virtual straight line with respect to the center line of the pressing surface 3 is increased, the hardness and the density of the portion corresponding to the outer periphery side of the brake rotor are unlikely to be lower than those of the inner periphery side.

Figure 3A:
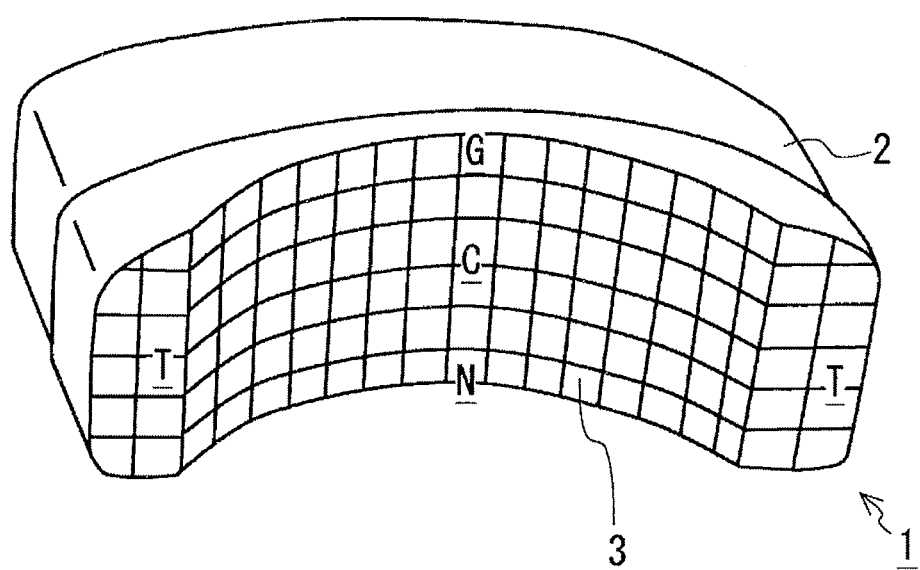
FIG. 3A is the first example of a view in which the shape of the pressing surface of the mold is polygon-displayed.

FIG. 3A is the first example of a view in which the shape of the pressing surface 3 of the mold 1 is polygon-displayed. The pressing surface 3 forms the curved surface of the concave shape that is formed by being gradually recessed from the end portion T side to the center portion C side of the pressing surface 3. That is, the pressing surface 3 forms the curved surface of the concave shape that is formed by being gradually recessed from two end portions T sides to the center portion C side in longitudinal direction, but is not inclined from the portion N corresponding to the inner periphery side of the brake rotor to the portion G corresponding to the outer periphery side of the brake rotor. Then, the pressing surface 3 has the flat portions in both end portions.

Figure 3B:
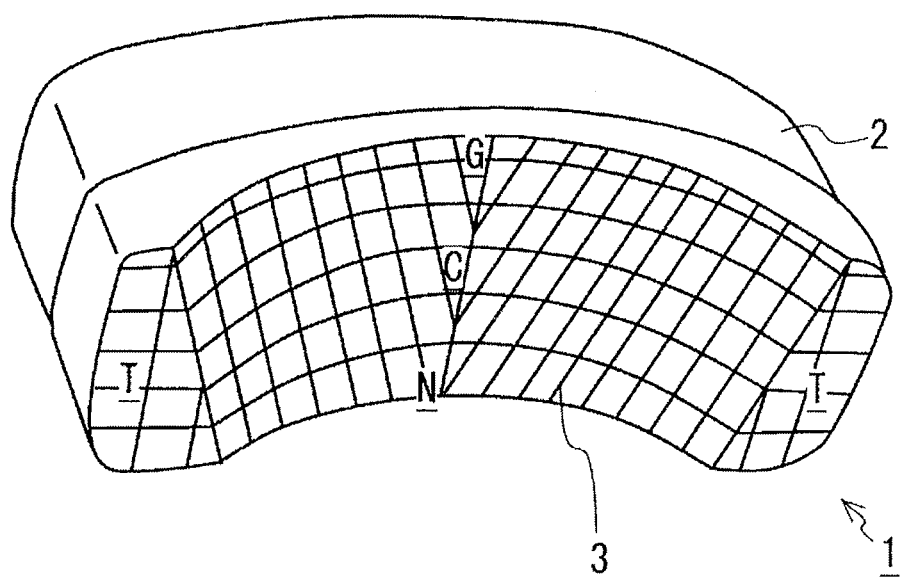
FIG. 3B is the second example of a view in which the shape of the pressing surface of the mold is polygon-displayed.

Moreover, as illustrated in FIGS. 2(A) to 2(D), if the aspect, in which the cross section of line A-A is inclined with respect to the center line of the pressing surface 3 by Θ degrees and which is recessed along the arc of which the axis is the second virtual straight line orthogonal to the extension line of the first virtual straight line orthogonal to the cross section of line A-A that is inclined by the degrees described above, is adopted, the pressing surface 3 of the mold 1 is as follows. FIG. 3B is the second example of a view in which the shape of the pressing surface 3 of the mold 1 is polygon-displayed. If the aspect which is recessed along the arc of which the axis is the second virtual straight line orthogonal to the extension line of the center line of the pressing surface 3 is adopted, the pressing surface 3 of the mold 1 is formed by being gradually recessed from the end portion T sides to the center portion C side of the pressing surface 3 and is inclined from the portion N corresponding to the inner periphery side of the brake rotor to the portion G corresponding to the outer periphery side of the brake rotor. Moreover, similar to the mold 1 illustrated in FIG. 3A, the pressing surface 3 has the flat portions in both end portions.

In the mold 1 according to the embodiment, since the pressing surface 3 is formed as described above, the preform that is preformed using the mold 1 has the following form.

FIGS. 4(A) to 4(C) are an example of views illustrating a manufacturing method of the brake pad friction material using the mold 1. If preforming is performed using the mold 1 described above, a powder material 5 is put into a mold frame 4 into which the mold 1 is fitted (FIG. 4(A)). Next, the powder material 5 put into the mold frame 4 is pressed by a pressing machine (an example of "pressing means" referred in this application) so as to be interposed between an upper mold 6 (the mold 1) and a lower mold 7 (FIG. 4(B)). Thus, a preform 8 which is obtained by pressurizing and molding the powder material 5 remains within the mold frame 4 (FIG. 4(C)). Moreover, as illustrated in FIGS. 4(A) to 4(C), the mold 1 according to the embodiment is not limited to the aspect which is used for the upper mold 6 and can be applied for the lower mold 7. If the mold 1 according to the embodiment is applied for the lower mold 7, the preform 8 is thermally molded together with a pressure plate to be pressed against the pressure plate and as the lower mold 7 illustrated in FIGS. 4(A) to 4(C), it is preferable that the upper mold 6 is configured such that a surface pressing the powder material 5 is flat.

When using the mold 1 illustrated in FIG. 3A, the pressing surface 3 of the mold 1 forms the curved surface having the concave shape that is formed by being gradually recessed from both end portion sides to the center portion side. Thus, if the powder material is put into the mold frame 4 before fluidity is lost and the pressing surface 3 presses the powder material, the powder material within the mold frame 4 flows in accordance with the shape of the pressing surface 3. As a result, in the mold 1, a surface forming the friction surface in the preform 8 is formed in a convex shape gradually swelling from the both end portion sides to the center portion side. Furthermore, both end portions in which chamfered portions of the friction material are provided for the purpose of preventing squeal are flatly formed.

That is, when using the mold 1 illustrated in FIG. 3A, the pressing surface 3 of the mold 1 according to the embodiment forms the curved surface having the concave shape that is formed by being gradually recessed from the end portion T sides to the center portion C side of the pressing surface 3. Thus, the preform 8 that is obtained by pressurizing and molding the powder material 5 is configured such that a friction surface forming region 9 that forms the friction surface coming into contact with the brake rotor in the surface of the preform 8 is formed in the convex shape that is gradually swelling from the both end portion sides to the center portion side of the friction surface forming region 9. The following brake pad can be made by thermally molding the preform 8 while pressurizing the preform 8 together with the pressure plate and through curing, grinding, scorching, painting, and the like which are conventional processes.

FIGS. 5(A) to 5(C) are a first example of views illustrating a manufacturing method of a brake pad. When performing preforming by using the preform 8, a pressure plate 13 is mounted on a mold frame 10 into which the preform 8 described above is fitted (FIG. 5(A)). Next, the preform 8 fitted into the mold frame 10 is pressed by the pressing machine such that a lower mold 11 is pushed to the pressure plate 13 (FIG. 5(B)). The mold frame 10 and the lower mold 11 are heated by a heater. Furthermore, a pressing surface 12 of the lower mold 11 pressing the preform 8 is flat. If the preform 8 fitted into the mold frame 10 is pressed by the pressing machine so as to be pushed to the pressure plate 13 by the lower mold 11, a friction material 15 that is thermally molded is pressed to the pressure plate 13 and a brake pad 14 is completed (FIG. 5(C)). The friction material 15 that is thermally molded from the preform 8 described above has the following physical properties.

The friction material 15 is thermally molded from the preform 8 having the friction surface forming region 9 of the convex shape gradually swelling from both end portion sides to the center portion side. Then, the powder material configuring the friction material 15 is in a substantially compacted state by the preform, and then fluidity is lost. Thus, in the friction material 15 that is thermally molded from the preform 8, at least the hardness and the density of both end portions are unlikely to be higher than those of the center portion. Furthermore, since the friction material 15 is thermally molded from the preform 8 of which both end portions are flat, both end portions in which chamfered portions of are provided for the purpose of preventing squeal have substantially uniform physical properties in the hardness and the density and even if a chamfering process is performed, the chamfered portion is stable in strength.

Moreover, when using the mold 1 illustrated in FIG. 3B, the friction surface forming region 9 of the preform 8 is inclined from the portion G side corresponding to the outer periphery side of the brake rotor to the portion N side corresponding to the inner periphery side of the brake rotor. In other words, in the preform 8, a portion near the center portion and a portion corresponding to the outer periphery side of the brake rotor are thick, and portions near both end portions and a portion corresponding to the inner periphery side of the brake rotor are thin. The friction material 15 that is thermally molded from the preform 8 has the following physical properties.

That is, when using the mold 1 illustrated in FIG. 3B, the friction material 15 is thermally molded from the preform 8 gradually swelling from the portion N side corresponding to the inner periphery side of the brake rotor to the portion G side corresponding to the outer periphery side of the brake rotor. Thus, in the friction material 15 that is thermally molded from the preform 8 described above, at least the density and the hardness on the outer periphery side are unlikely to be lower than those on the inner periphery side.

Meanwhile, the chamfered portion of the friction material 15 may be formed by performing grinding after heat treatment such as thermoforming and curing, or, for example, it may be obliquely inclined by boosting both end portions of the pressing surface 12 of the lower mold 11. FIGS. 6(A) to 6(C) are a second example of views illustrating a manufacturing method of a brake pad. If oblique inclination is provided by boosting both end portions of the pressing surface 12 of the lower mold 11, as illustrated in FIGS. 6(A) to 6(C), it is possible to perform the chamfering process in both end portions of the friction material 15 simultaneously with thermal molding.

Figure 7:
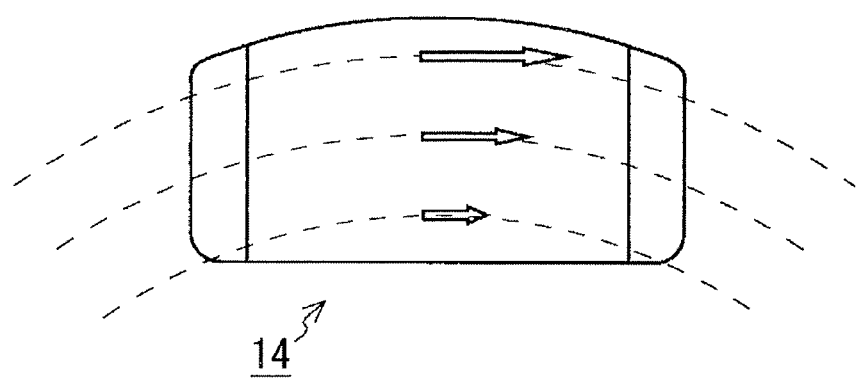
FIG. 7 is an example of a view in which peripheral speeds of the brake rotor sliding on the friction surface of the brake pad are indicated by arrows.

FIG. 7 is an example of a view in which peripheral speeds of the brake rotor sliding on the friction surface of the brake pad are indicated by arrows. The peripheral speed of the brake rotor sliding on the friction surface of the brake pad is not uniform within the friction surface. For example, in the brake rotor of the disc brake, the peripheral speed on the outer periphery side is faster than the peripheral speed on the inner periphery side. Thus, wear of the friction material in the portion corresponding to the outer periphery side is likely to progress more than that in the portion corresponding to the inner periphery side of the brake rotor. However, if it is the friction material 15 that is thermally molded from the preform 8 created by the mold 1 illustrated in FIG. 3B, the hardness and the density of both end portions are unlikely to be higher than those of the center portion, and at least the density and the hardness on the outer periphery side is unlikely to be lower than those on the inner periphery side. Thus, wear of the friction material and the like are uniformly progressed and the appropriate physical properties of the friction material according to the peripheral speed of a rotating brake rotor can be realized.

Here, features of the embodiments of the mold of the brake pad friction material, the manufacturing apparatus, the manufacturing method, the preform, and the brake pad according to the invention described above are respectively and briefly summarized and listed as the following [1] to [7].

[1] The mold of the brake pad friction material, including:
the mold member (2) fitted into the mold frame (4) into which the powder material (5) of the brake pad friction material is put,
in which the mold member has a concave shape that the pressing surface (3) in the surface of the mold member, which forms the region abutting the powder material put into the mold frame, is gradually recessed from the both end portion sides (end portion T sides) to the center portion side (center portion C side) of the pressing surface.

[2] The mold of the brake pad friction material according to [1], in which the pressing surface is inclined from the portion corresponding to the inner peripheral side of the brake rotor to the portion corresponding to the outer peripheral side of the brake rotor.

[3] The mold of the brake pad friction material according to [1] or [2], in which the pressing surface has the flat portions in both end portions thereof.

[4] The manufacturing apparatus of the brake pad friction material including
the mold frame (4) into which the powder material (5) of the brake pad friction material is put,
the mold member (2) fitted into a mold frame, and
pressing means for pressing the mold member, and pressurizing and molding the powder material put into the mold frame by the mold member,
in which the mold member has a concave shape that the pressing surface (3) in the surface of the mold member, which forms the region abutting the powder material put into the mold frame, is gradually recessed from the both end portion sides (end portion T sides) to the center portion side (center portion C side) of the pressing surface, and
the pressing means pressurizes and molds the powder material put into the mold frame by the pressing surface.

[5] The manufacturing method of a brake pad friction material including:
putting the powder material (5) of the brake pad friction material into the mold frame (4) into which the mold member (2) is fitted; and
pressing the mold member, so as to pressurize and mold the powder material put into the mold frame by the pressing surface (3) in the surface of the mold member,
the pressing surface (3) forms the region abutting the powder material put into the mold frame and has the concave shape that is gradually recessed from the both end portion sides (end portion T sides) to the center portion side (center portion C side) of the pressing surface.

[6] The preform (8) that is obtained by pressurizing and forming the powder material of the brake pad friction material,
in which the friction surface forming region (9) in the surface of the preform, which forms the friction surface coming into contact with the brake rotor, has the convex shape gradually swelling from the both end portion sides to the center portion side of the friction surface forming region.

[7] The brake pad including the thermoformed product (friction material 15) that is obtained by thermally forming the powder material of the brake pad friction material,
in which the thermoformed product has the friction surface coming into contact with the brake rotor,
the friction surface forms a part of the surface of the thermoformed product, and
at least hardness and density of both end portions of the thermoformed product are not higher than those of the center portion of the thermoformed product.

While the invention has been described with reference to detailed or specific embodiments, the invention will be apparent to those skilled in the art that it is possible to make various changes and modifications without departing from the spirit and scope of the invention.

This application is based on Japanese patent application filed on Jun. 18, 2013 (Japanese Patent Application No. 2013-127494) and the contents of which are incorporated herein by reference.

INDUSTRIAL APPLICABILITY

According to the invention, it is possible to make appropriate the physical properties of the friction material of both end portions of the brake pad. The invention achieving the effects is useful with respect to the mold of the brake pad friction material, the manufacturing apparatus, the manufacturing method, the preform, and the brake pad.

REFERENCE SIGNS LIST

1 . . . mold
2 . . . mold member
3 . . . pressing surface
4 . . . mold frame
5 . . . powder material
6 . . . upper mold
7 . . . lower mold
8 . . . preform
9 . . . friction surface forming region
10 . . . mold frame
11 . . . lower mold
12 . . . pressing surface
13 . . . pressure plate
14 . . . brake pad
15 . . . friction material

The invention claimed is:

1. A mold of a preform brake pad friction material, comprising:
a mold member movably fitted into a mold frame into which a powder material of the preform brake pad friction material is put,
wherein the mold member has a concave shape such that a pressing surface of the mold member, which forms a region abutting the powder material put into the mold frame, is gradually recessed from both end portion sides to a center portion side of the pressing surface, and
another molding member movably fitted into the mold frame,
wherein a pressing surface of the another molding member opposing the pressing surface of the mold member is flat.

2. The mold of the brake pad friction material according to claim 1, wherein
the pressing surface of the mold member is inclined from a portion corresponding to an inner peripheral side of a brake rotor to a portion corresponding to an outer peripheral side of the brake rotor.

3. The mold of the brake pad friction material according to claim 1, wherein
the pressing surface of the mold member has flat portions in both end portions thereof.

4. A manufacturing apparatus of a preform brake pad friction material, comprising:
a mold frame into which a powder material of the preform brake pad friction material is put;
a mold member movably fitted into the mold frame;
a pressing means for pressing the mold member, and pressurizing and molding the powder material put into the mold frame by the mold member,
wherein the mold member has a concave shape such that a pressing surface of the mold member, which forms a region abutting the powder material put into the mold frame, is gradually recessed from both end portion sides to a center portion side of the pressing surface; and
another molding member movably fitted into the mold frame,
wherein a pressing surface of the another molding member opposing the pressing surface of the mold member is flat,
wherein the pressing means pressurizes and molds the powder material put into the mold frame by the pressing surface of the mold member.

5. The mold of the brake pad friction material according to claim 2, wherein
the pressing surface has flat portions in both end portions thereof.

* * * * *